H. A. Gaston,
Revolving Harrow,
Nº 95,788. Patented Oct. 12, 1869.
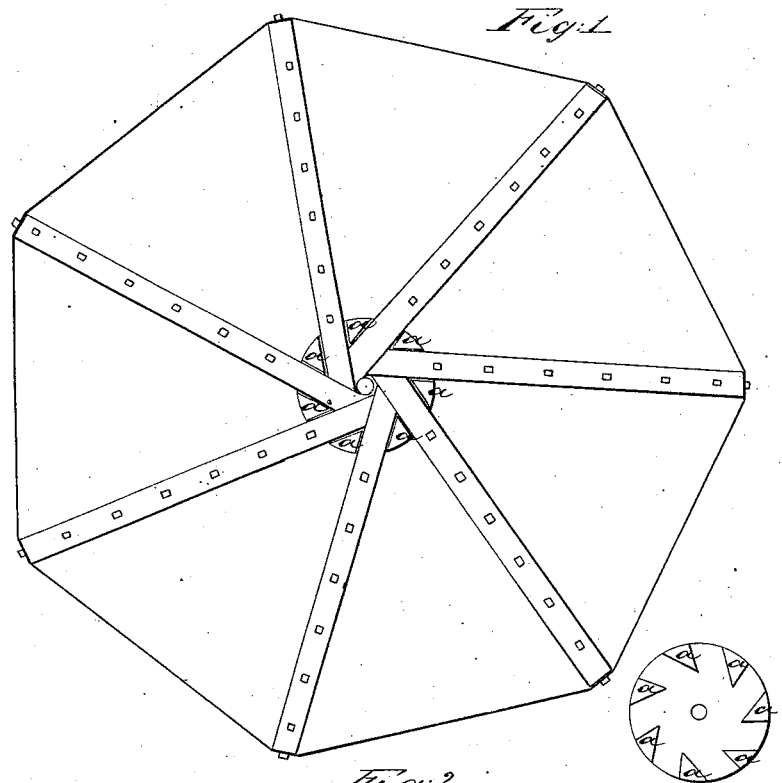
Fig. 1
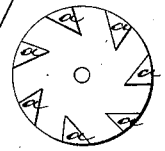
Fig. 2
Fig. 3
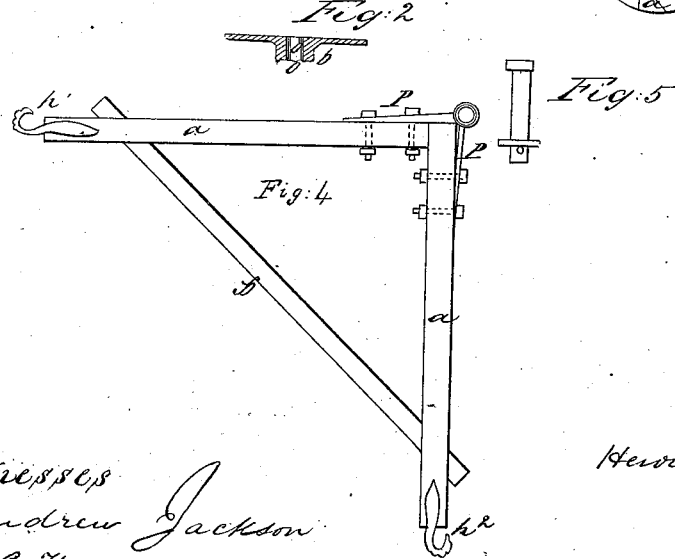
Fig. 5
Fig. 4
Witnesses
Andrew Jackson
H. C. Hostetter
Inventor
Henry A. Gaston

United States Patent Office.

HENRY A. GASTON, OF STOCKTON, CALIFORNIA.

Letters Patent No. 95,788, dated October 12, 1869.

IMPROVEMENT IN ROTARY HARROW.

The Schedule referred to in these Letters Patent and making part of the same.

*To all whom it may concern:*

Be it known that I, HENRY A. GASTON, of Stockton, in the county of San Joaquin, and State of California, have invented certain new and useful Improvements in the Construction of Harrows; and I do hereby declare that the following is a full, clear, and exact description of the construction and operation of the same, reference being had to the annexed drawings, making a part of this specification, in which—

Figure 1 is a top plan view of my harrow, showing its arms $c$, the upper side of its lower central casting, $a\ a$, &c., and its outer rim or band, $t$.

Figure 2 is a transverse central sectional view of the upper casting, showing a boss, $b$, extending upward from its upper surface.

Figure 3 represents the lower side of the upper casting, being the reverse of the upper side of the lower.

Figure 4 represents a right-angled triangular frame, each arm of which equals or exceeds in length an arm of the harrow, and which is provided, at its angle, with the loop $o$ and its extensions P P, and which is also provided with a cross-bar, $f$.

Figure 5 represents a bolt, provided with a head at one end, and a washer at the other, which bolt passes through the loop $o$, fig. 4, and the orifices O, in figs. 1, 2, and 3, thereby attaching the triangular frame, fig. 4, to the rotating part of the harrow.

The nature of my invention consists in arranging the arms of a harrow at tangents of a circle, and bracing and supporting each the other, in such a way that all the strength of the timber is retained throughout the length of the arm, that framing is dispensed with; that none of the teeth in one arm can track those of another arm; and, by another simple and novel contrivance, causing the harrow to rotate upon its own axis, thereby harrowing and cross-harrowing the ground over which it is hauled at one operation.

To enable others skilled in the art to make and use my invention, I will proceed to describe its construction, premising that, for the purpose of explanation, the drawings may be taken as on a scale of one inch for one foot.

I provide two novel iron disks, as seen at fig. 3, and at the centre of fig. 1, upon the inner surfaces of which I provide the right and left-hand projections, seen upon each side of the letters $a$, extending such projections not quite half the depth of the arms, which I wish them to clasp, and so far apart that they embrace such arms closely on each side.

I provide the same surfaces of these disks with central projecting cylindrical hubs, as seen around the letters $o$, figs. 1 and 3, that in this novel way, I may firmly support the inner ends of the arms C.

The entire framing of the harrow is done with the saw, and consists in the novelty of sawing the timber off at the angles seen in the drawing, fig. 1.

The right-angled triangle I terminate in a novel manner, by providing a hook at the end of each arm, as seen at $h^1$ and $h^2$.

By this novel contrivance, when I desire to rotate my harrow from right to left, I draw by hook $h^1$, and the weight of the opposite arm of the triangle, and hook $h^2$, press that side of the harrow a little deeper into the earth than its opposite, and causes the harrow to revolve, while, if I wish it to turn from left to right, I draw by hook $h^2$, and the harrow rotates in the opposite direction.

This novel harrow never requires to be lifted; cannot be clogged; wears its teeth evenly on all sides; performs twice the work of the square harrow, with the same labor and one operation; and possesses the great feature of simplicity which farmers desire.

I am aware of a German harrow having a triangular frame like mine; but that frame has but one hook, so that the harrow can never be reversed by its use.

I am also aware that there is a triangular frame having one hook, and one of the arms hinged at the centre of the harrow, so that it may be thrown over to the other side, and thus reverse the motion of the harrow; but this invention is inferior to mine in simplicity, cheapness, and strength.

Furthermore, I am informed that there is a harrow having a draw-bar extending straight across the whole circle, and having a hook at each end. This device, however, is not the equivalent of mine, because neither of the arms serves as a weight, and an additional weight has to be provided.

A further advantage resulting from the use of my draw-frame is that, if desired, two horses can be hitched on at once, with an interval between them, to keep them from quarrelling, or heating each other.

What I claim as my invention, and desire to secure by Letters Patent, is—

1. The central right and left disks, with their projections (right and left) and their central cylindrical projections, when constructed substantially as above described.

2. The right-angled triangular frame, provided with the hooks $h^1$ and $h^2$, constructed substantially as and for the purpose above described.

3. A rotary harrow, constructed and operated substantially as above described.

Witnesses:         HENRY A. GASTON.
  CHARLES H. SANFORD,
  SULLIVAN C. CASS.